United States Patent
Idris et al.

(10) Patent No.: US 10,195,525 B2
(45) Date of Patent: *Feb. 5, 2019

(54) CONTACTLESS TACTILE FEEDBACK ON GAMING TERMINAL WITH 3D DISPLAY

(71) Applicant: IGT CANADA SOLUTIONS ULC, Moncton (CA)

(72) Inventors: Fayez Idris, Dieppe (CA); David Froy, Lakeville (CA)

(73) Assignee: IGT CANADA SOLUTIONS ULC, Moncton (CA)

( * ) Notice: Subject to any disclaimer, the term of this patent is extended or adjusted under 35 U.S.C. 154(b) by 1009 days.

This patent is subject to a terminal disclaimer.

(21) Appl. No.: 14/573,503

(22) Filed: Dec. 17, 2014

(65) Prior Publication Data

US 2016/0175709 A1    Jun. 23, 2016

(51) Int. Cl.
*A63F 9/24* (2006.01)
*A63F 13/00* (2014.01)
(Continued)

(52) U.S. Cl.
CPC .............. *A63F 13/355* (2014.09); *A63F 9/24* (2013.01); *A63F 13/211* (2014.09);
(Continued)

(58) Field of Classification Search
CPC .......... A63F 13/00; A63F 13/10; A63F 13/53; A63F 13/57; A63F 13/66
See application file for complete search history.

(56) References Cited

U.S. PATENT DOCUMENTS

| | | | |
|---|---|---|---|
| 8,139,029 B2* | 3/2012 | Boillot | G06F 3/0325 345/158 |
| 8,493,354 B1* | 7/2013 | Birnbaum | G06F 3/016 340/407.2 |

(Continued)

FOREIGN PATENT DOCUMENTS

WO    2006120508    11/2006

OTHER PUBLICATIONS

Hoshi et al.: "Non-contact Tactile Sensation Synthesized by Ultrasound Transducers", Third Joint Eurohaptics Conference and Symposium on Haptic Interfaces for Virtual Environment and Teleoperator Systems, Salt Lake City, UT, USA, Mar. 18-20, 2009 (Mar. 18, 2009), Retrieved on Jul. 14, 2015 from URL: http://ieeexplore.ieee.org/stamp/stamp.jsp?tp=&arnumber=4810900&tag=1.

(Continued)

*Primary Examiner* — Milap Shah
*Assistant Examiner* — Jason Pinheiro
(74) *Attorney, Agent, or Firm* — Sage Patent Group

(57) ABSTRACT

An electronic gaming machine (EGM) includes a display having a display surface configured to provide stereoscopic 3D viewing of at least a portion of the game. The portion of the game includes a 3D interface element. The EGM further includes a locating sensor that generates an electronic signal based on a player's location in a sensing space. The EGM includes an ultrasonic emitter configured to emit an ultrasonic field. At least a portion of the ultrasonic field is located in the sensing space. The EGM also includes one or more processors configured to: identify a location of one or more player features based on the electrical signal from the locating sensor; determine that the location of the player features is associated with the 3D interface element; and control one or more of the ultrasonic emitters based on the identified location to provide tactile feedback to the player.

18 Claims, 7 Drawing Sheets

(51) Int. Cl.
  *G06F 17/00* (2006.01)
  *G06F 19/00* (2018.01)
  *A63F 13/355* (2014.01)
  *A63F 13/211* (2014.01)
  *A63F 13/213* (2014.01)
  *A63F 13/2145* (2014.01)
  *A63F 13/215* (2014.01)
  *A63F 13/285* (2014.01)
  *G07F 17/32* (2006.01)
  *A63F 13/25* (2014.01)
  *A63F 13/428* (2014.01)

(52) U.S. Cl.
  CPC .......... *A63F 13/213* (2014.09); *A63F 13/215* (2014.09); *A63F 13/2145* (2014.09); *A63F 13/25* (2014.09); *A63F 13/285* (2014.09); *A63F 13/428* (2014.09); *G07F 17/32* (2013.01); *G07F 17/3206* (2013.01); *G07F 17/3211* (2013.01); *A63F 2009/241* (2013.01); *A63F 2009/2435* (2013.01); *A63F 2009/2447* (2013.01); *A63F 2009/2457* (2013.01); *A63F 2009/2479* (2013.01)

(56) References Cited

U.S. PATENT DOCUMENTS

| | | | |
|---|---|---|---|
| 8,546,706 B2 | 10/2013 | Altman et al. | |
| 8,766,953 B1 | 7/2014 | Cheatham, III et al. | |
| 2009/0187374 A1 | 7/2009 | Baxter et al. | |
| 2009/0250267 A1* | 10/2009 | Heubel | G06F 3/016 178/18.03 |
| 2011/0199342 A1* | 8/2011 | Vartanian | G06F 3/016 345/177 |
| 2011/0244963 A1* | 10/2011 | Grant | G06F 3/011 463/37 |
| 2014/0184588 A1 | 7/2014 | Cheng et al. | |
| 2014/0287806 A1 | 9/2014 | Balachandreswaran | |
| 2015/0007025 A1* | 1/2015 | Sassi | H04M 19/047 715/702 |
| 2015/0145657 A1* | 5/2015 | Levesque | G06F 3/016 340/407.2 |
| 2015/0192995 A1* | 7/2015 | Subramanian | G06F 3/016 340/407.1 |

OTHER PUBLICATIONS

WIPO, Search Report relating to Application No. PCT/CA2015/050183, dated Aug. 31, 2015.

* cited by examiner

CONTACTLESS TACTILE FEEDBACK ON GAMING TERMINAL WITH 3D DISPLAY

TECHNICAL FIELD

The present disclosure relates generally to electronic gaming systems, such as casino gaming terminals. More specifically, the present disclosure relates to methods and systems for providing tactile feedback on electronic gaming systems.

BACKGROUND

Gaming terminals and systems, such as casino-based gaming terminals, often include a variety of physical input mechanisms which allow a player to input instructions to the gaming terminal. For example, slot machines are often equipped with a lever which causes the machine to initiate a spin of a plurality of reels when engaged.

Modern day gaming terminals are often electronic devices. Such devices often include a display that renders components of the game. The displays are typically two dimensional displays, but three-dimensional displays have recently been used. While three dimensional displays can be used to provide an immersive gaming experience, they present numerous technical problems. For example, since three dimensional displays manipulate a player's perception of depth, it can be difficult for a player to determine how far they are away from the screen since the objects that are rendered on the display may appear at a depth that is beyond the depth of the display. In some instances, a player interacting with the game may inadvertently contact the display during game play or may contact the display using a force that is greater than the force intended.

Thus, there is a need for improved gaming terminals.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

There is described an electronic gaming machine for providing a game to a player. The electronic gaming machine includes a display having a display surface. The display is configured to provide stereoscopic three dimensional viewing of at least a portion of the game. The portion of the game includes a three dimensional interface element for activation by the player. The electronic gaming machine further includes a locating sensor that generates an electronic signal based on a player's location in a sensing space. The sensing space includes a region adjacent to the display surface. The electronic gaming machine also includes at least one ultrasonic emitter configured to emit an ultrasonic field when the ultrasonic emitter is activated. At least a portion of the ultrasonic field is located in the sensing space. The ultrasonic field provides a pressure differential detectible by a human hand. The electronic gaming machine also includes one or more processors coupled to the display, the locating sensor and the plurality of ultrasonic emitters. The processors configured to: identify a location of one or more player features based on the electrical signal from the locating sensor; determine that the location of the one or more player features is associated with the three dimensional interface element; and control one or more of the ultrasonic emitters based on the identified location to provide tactile feedback to the player.

In another aspect, there is described a method for providing contactless feedback to a player at an electronic gaming machine. The method includes: identifying a location of one or more player features using data from a locating sensor; determining that the location of the one or more player features is associated with a three dimensional interface element; and controlling one or more ultrasonic emitters based on the identified location to provide tactile feedback to the player.

In another aspect, there is described a non-transitory computer readable medium containing instructions which, when executed, cause a processor to: identify a location of one or more player features using data from a locating sensor; determine that the location of the one or more player features is associated with a three dimensional interface element; and control one or more ultrasonic emitters based on the identified location to provide tactile feedback to the player.

Other aspects and features of the present application will become apparent to those ordinarily skilled in the art upon review of the following description of specific embodiments of the application in conjunction with the accompanying figures.

Figure 1:
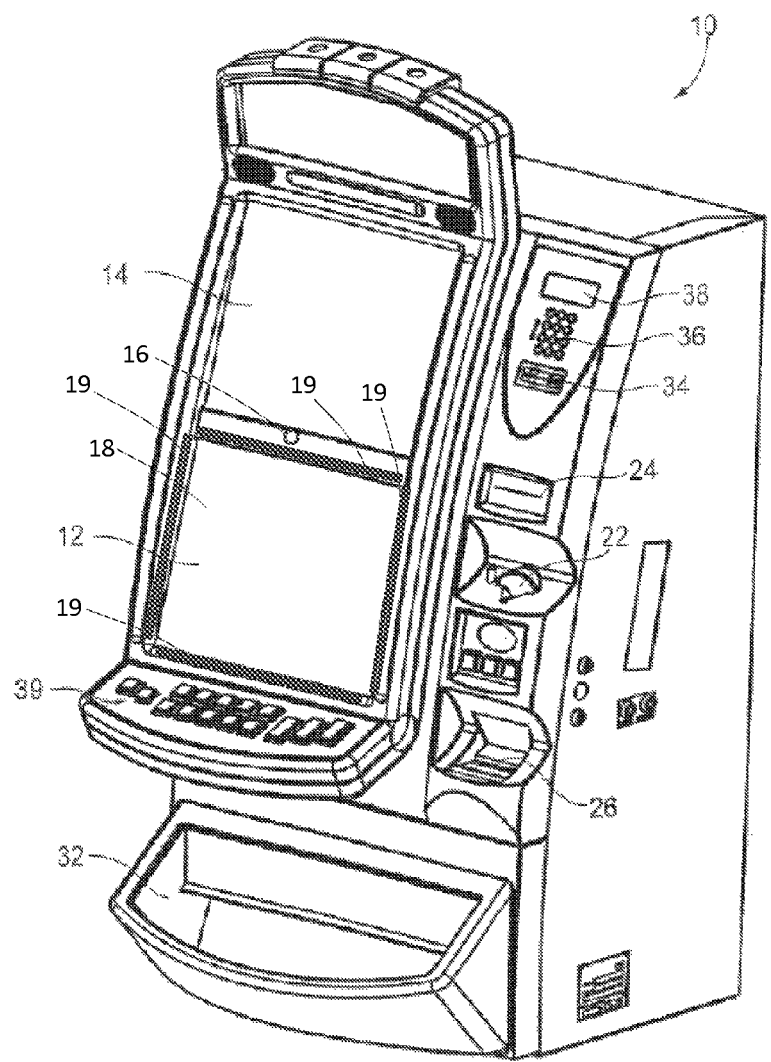
FIG. 1 shows an example electronic gaming system (EGM) in accordance with example embodiments of the present disclosure.

The improvements described herein may be included in any one of a number of possible gaming systems including, for example, a computer, a mobile device such as a smart phone or tablet computer, a casino-based gaming terminal, a wearable device such as a virtual reality (VR) or augmented reality (AR) headset, or gaming devices of other types. In at least some embodiments, the gaming system may be connected to the Internet via a communication path such as a Local Area Network (LAN) and/or a Wide Area Network (WAN). In at least some embodiments, the gaming improvements described herein may be included in an Electronic Gaming Machine (EGM). An example EGM 10 is illustrated in FIG. 1. The techniques described herein may also be applied to other electronic devices that are not gaming systems.

The example EGM 10 of FIG. 1 is shown in perspective view. The example EGM 10 is configured to provide a three-dimensional (3D) viewing mode in which at least a portion of a game is displayed in 3D. The EGM 10 provides contactless tactile feedback (which may also be referred to as haptic feedback) during at least a portion of the 3D viewing mode of the game. As will be described below, the EGM 10 is provided with a contactless feedback subsystem which uses one or more ultrasonic transducers in order to provide tactile feedback to a player of the game. More particularly, an ultrasonic transducer is selectively controlled so as to cause a pressure differential at particular location, such as a location associated with the player's hand. Such a pressure may, for example, be generated at a location associated with an index finger of the player to provide tactile feedback to the player.

The tactile feedback is, in at least some embodiments, provided to feedback information about the physical location of a component of the EGM 10 or to feedback information about virtual buttons or other interface elements that are provided within the game. For example, in an embodiment, tactile feedback may be provided to warn a player that the player's finger is relatively close to a display 12 of the EGM 10. Such a warning may prevent the user from inadvertently contacting the EGM 10. For example, such a warning may prevent the user from jarring their finger on the display 12. In some embodiments, tactile feedback provides feedback related to three dimensional interface elements. An interface element is a component of the game that is configured to be activated. By way of example, the interface element may be a link, push button, dropdown button, toggle, field, list box, radio button, checkbox, or an interface element of another type. The interface element may, in at least some embodiments, be a game element. The game element is a rendered input interface, such as a piano key, for example.

A three dimensional interface element is an interface element which is rendered in 3D. The three dimensional interface element may be displayed at an artificial depth (i.e. while it is displayed on the display, it may appear to be closer to the user or further away from the user than the display). The three dimensional interface element is associated with a location or a set of locations on the display or in 3D space and, when a player engages the relevant location(s), the three dimensional interface element may be said to be activated or engaged.

For example, an interface element may be provided at a particular location on the display or at a particular location in 3D space relative to a location on the display. In some embodiments, a virtual button may be provided on the display and may be activated by touching a corresponding location on the display or, in other embodiments, by touching a location in 3D space that is associated with the interface element (e.g. a location away from the display that is substantially aligned with the virtual button such as a location in 3D space that is between the player's eyes and the virtual button). In some embodiments, contactless tactile feedback may be used to notify a player when they are near the virtual button. Similarly, in some embodiments, contactless tactile feedback may be used to notify a player when they have activated the virtual button. Contactless tactile feedback may be used in other scenarios apart from those listed above.

Accordingly, the EGM 10 includes a primary display 12 which may be of a variety of different types including, for example, a thin film transistor (TFT) display, a liquid crystal display (LCD), a cathode ray tube (CRT), a light emitting diode (LED) display, an organic light emitting diode (OLED) display, or a display of another type.

The display 12 is a three-dimensional (3D) display which may be operated in a 3D mode. That is, the display is configured to provide 3D viewing of at least a portion of a game. For example, the display 12, in conjunction with other components of the EGM 10, may provide stereoscopic 3D viewing of a portion of the game that includes a three dimensional interface element for activation by a player.

More particularly, the display 12 may be configured to provide an illusion of depth by projecting separate visual information for a left eye and for a right eye of a user. The display 12 may be an auto stereoscopic display. An auto stereoscopic display is a display that does not require special glasses to be worn. That is, the 3D effect is provided by the display itself, without the need for headgear, such as glasses. In such embodiments, the display 12 is configured to provide separate visual information to each of a user's eyes. This separation is, in some embodiments, accomplished with a parallax barrier or lenticular technology.

The EGM 10 may also include a 3D level controller (not shown). The 3D level controller is configured to control the depth of 3D images and videos. In such cases, an ultrasound level provided by ultrasonic emitters and the location of a focal point provided by the ultrasonic emitter(s) may be changed, by the EGM 10, to accommodate the required 3D depth.

For the purposes of discussing orientation of the display 12 with respect to other components of the EGM 10 or the player, a front side of the display and a back side of the display will be defined. The front side of the display will generally be referred to as a display surface 18 and is the portion of the display 12 upon which displayed features of the game are rendered and which is generally viewable by the player. The display surface 18 is flat in the example of FIG. 1, but curved display surfaces are also contemplated. The back side of the display is the side of the display that is generally opposite the front side of the display. In the example illustrated, the display 12 has a display surface 18 that is substantially rectangular, having four sides including a left side, a right side, a top side and a bottom side.

In some embodiments, to provide a lenticular-based 3D stereoscopic effect, the auto stereoscopic display includes a lenticular screen mounted on a conventional display, such as an LCD. The images may be directed to a viewer's eyes by switching LCD subpixels.

The EGM 10 includes a locating sensor which generates an electronic signal based on a player's location within a sensing space. In at least some embodiments, the sensing space includes a region that is adjacent to the display surface. For example, the sensing space may include a region which is generally between the player and the display 12. The locating sensor is used to track the user. More particularly, the locating sensor may be used to track a player feature. A "player feature", as used herein, is a particular feature of the player such as, for example, a particular body part of the player. For example, the player feature may be a hand, a finger (such as an index finger on an outstretched hand), the player's eyes, etc.

In an embodiment, the locating sensor includes a camera 16 which is generally oriented in the direction of a player of the EGM 10. For example, the camera 16 may be directed so that a head of a user of the EGM 10 will generally be visible by the camera while that user is operating the EGM 10. The camera 16 may be a digital camera that has an image sensor that generates an electrical signal based on received light. This electrical signal represents camera data and the camera data may be stored in memory of the EGM in any suitable image or video file format. The camera may be a stereo camera which includes two image sensors (i.e. the camera may include two digital cameras). These image sensors may be mounted in spaced relation to one another. The use of multiple cameras allows multiple images of a user to be obtained at the same time. That is, the cameras can generate stereoscopic images and these stereoscopic images allow depth information to be obtained. For example, the EGM 10 may be configured to determine a location of a user relative to the EGM 10 based on the camera data.

The locating sensor may cooperate with other components of the EGM 10, such as a processor, to provide a player feature locating system. The player feature locating subsystem determines player location information such as the depth of a player feature (e.g., distance between the user's eyes, head or finger and the EGM 10) and lateral location information representing the lateral location of a user's eyes, hand or finger relative to the EGM 10. Thus, from the camera data the EGM 10 may determine the location of a player feature in a three dimensional space (e.g., X, Y, and Z coordinates representing the location of a user's eyes relative to the EGM may be obtained). In some embodiments, the location of each of a user's eyes in three dimensional space may be obtained (e.g, X, Y and Z coordinates may be obtained for a right eye and X, Y and Z coordinates may be obtained for a left eye). Accordingly, the camera may be used for eye-tracking. In some embodiments, the location of a player's hand or fingertip in three dimensional space may be determined. For example, X, Y and Z coordinates for the hand or fingertip may be obtained.

In at least some embodiments, a single locating sensor may be used to track multiple player features. For example, a camera (such as s stereoscopic camera) may be used by the EGM 10 to track a first player feature, such as the location of a player's eyes and also a second player feature, such as the location of a player's hand, finger or fingertip. The location of the player's eyes may be used, by the EGM 10, to provide stereoscopy on the display 12. The location of the hand, finger or fingertip may be used, by the EGM 10, in order to determine whether an interface element has been activated (i.e. to determine whether an input command has been received from the hand) and to selectively control one or more ultrasonic transmitters to provide tactile feedback at the location of the hand, finger, or fingertip.

In the example of FIG. 1, the camera 16 is mounted immediately above the display 12, midway between left and right ends of the display. However, the camera may be located in other locations in other embodiments.

The player feature locating subsystem may include other locating sensors instead of or in addition to the camera. For example, in at least some embodiments, the display 12 is a touchscreen display which generates an electrical signal in response to receiving a touch input at the display surface 18. The electrical signal indicates the location of the touch input on the display surface 18 (e.g., it may indicate the coordinates of the touch input such as X and Y coordinates of the input). Thus, the touchscreen display may be used to determine the location of a player feature that contacts the display 12, such as a finger.

In some embodiments, the display 12 may be a hover-sensitive display that is configured to generate an electronic signal when a finger or hand is hovering above the display screen (i.e. when the finger is within close proximity to the display but not necessarily touching the display). Similar to the touchscreen, the electronic signal generated by the hover-sensitive display indicates the location of the finger (or hand) in two dimensions, such as using X and Y coordinates. Accordingly, the hover-sensitive display may act as a locating sensor and the electronic signal generated by the hover-sensitive display may be used by the player feature locating subsystem to determine the location of the player feature.

The EGM 10 may include a video controller that controls the display 12. The video controller may control the display 12 based on camera data. That is, the player feature locating subsystem may be used to identify the location of the user's eyes relative to the EGM 10 and this location may be used, by the video controller, to control the display 12 and ensure that the correct data is projected to the left eye and to the right eye. In this way, the video controller adjusts the display based on the eye tracking performed on camera data received from the camera—the camera tracks the position of the user's eyes to guide a software module which performs the switching for the display.

The EGM 10 of FIG. 1 also includes a second display 14. The second display provides game data or other information in addition to the display 12. The second display 14 may provide static information, such as an advertisement for the game, the rules of the game, pay tables, pay lines, or other information, or may even display the main game or a bonus game along with the display 12. The second display 14 may utilize any of the display technologies noted above (e.g., LED, OLED, CRT, etc.) and may also be an auto stereoscopic display. In such embodiments, the second display 14 may be equipped with a secondary camera (which may be a stereo camera) for tracking the location of a user's eyes relative to the second display 14. In some embodiments, the second display may not be an electronic display; instead, it may be a display glass for conveying information about the game.

The EGM 10 includes at least one ultrasonic emitter 19, which comprises at least one ultrasonic transducer. The ultrasonic transducer is configured to emit an acoustic field when the ultrasonic transducer is activated. More particularly, the ultrasonic transducer generates an ultrasonic field in the form of an ultrasonic wave. An ultrasonic field is a sound with a frequency that is greater than the upper limit of human hearing (e.g., greater than 20 kHz). The ultrasonic transducer may be of a variety of types. In an embodiment, the ultrasonic transducer includes a piezoelectric element which emits the ultrasonic wave. More particularly, a piezoelectric high frequency transducer may be used to generate the ultrasonic signal. In at least one embodiment, the ultrasonic transducers may operate at a frequency of 40 kHz or higher.

The ultrasonic wave generated by the ultrasonic transducers creates a pressure differential which can be felt by human skin. More particularly, the ultrasonic wave displaces air and this displacement creates a pressure difference which is can be felt by human skin (e.g., if the wave is focussed at a player's hand it will be felt at the hand).

In order to cause a large pressure difference, each ultrasonic emitter 19 may include an array of ultrasonic transducers. That is, a plurality of ultrasonic transducers in each ultrasonic emitter 19 may be used and may be configured to operate with a phase delay so that ultrasonic waves from multiple transducers arrive at the same point concurrently. This point may be referred to as the focal point.

The ultrasonic transducers are each oriented so that at least a portion of the ultrasonic field is located within the sensing space (i.e. is located within the region that can be sensed by the locating sensor). That is, at least a portion of the ultrasonic field is located in front of the display 12.

The EGM 10 is equipped with one or more input mechanisms. For example, in some embodiments, one or both of the displays 12 and 14 may be a touchscreen which includes a touchscreen layer, such as a touchscreen overlay. The touchscreen layer is touch-sensitive such that an electrical signal is produced in response to a touch. In an embodiment, the touchscreen is a capacitive touchscreen which includes a transparent grid of conductors. Touching the screen causes a change in the capacitance between conductors, which allows the location of the touch to be determined. The touchscreen may be configured for multi-touch.

Other input mechanisms may be provided instead of or in addition to the touchscreen. For example, a keypad 36 may accept player input, such as a personal identification number (PIN) or any other player information. A display 38 above keypad 36 displays a menu for instructions and other information and provides visual feedback of the keys pressed. The keypad 36 may be an input device such as a touchscreen, or dynamic digital button panel, in accordance with some embodiments.

Control buttons 39 may also act as an input mechanism and be included in the EGM. The control buttons 39 may include buttons for inputting various input commonly associated with a game provided by the EGM 10. For example, the control buttons 39 may include a bet button, a repeat bet button, a spin reels (or play) button, a maximum bet button, a cash-out button, a display pay lines button, a display payout tables button, select icon buttons, or other buttons. In some embodiments, one or more of the control buttons may be virtual buttons which are provided by a touchscreen.

The EGM 10 may also include currency, credit or token handling mechanisms for receiving currency, credits or tokens required for game play or for dispensing currency, credits or tokens based on the outcome of the game play. A coin slot 22 may accept coins or tokens in one or more denominations to generate credits within EGM 10 for playing games. An input slot 24 for an optical reader and printer receives machine readable printed tickets and outputs printed tickets for use in cashless gaming.

A coin tray 32 may receive coins or tokens from a hopper upon a win or upon the player cashing out. However, the EGM 10 may be a gaming terminal that does not pay in cash but only issues a printed ticket which is not legal tender. Rather, the printed ticket may be converted to legal tender elsewhere.

In some embodiments, a card reader interface 34, such as a card reader slot, may allow the EGM 10 to interact with a stored value card, identification card, or a card of another type. A stored value card is a card which stores a balance of credits, currency or tokens associated with that card. An identification card is a card that identifies a user. In some cases, the functions of the stored value card and identification card may be provided on a common card. However, in other embodiments, these functions may not be provided on the same card. For example, in some embodiments, an identification card may be used which allows the EGM 10 to identify an account associated with a user. The identification card uniquely identifies the user and this identifying information may be used, for example, to track the amount of play associated with the user (e.g., in order to offer the user promotions when their play reaches certain levels). The identification card may be referred to as a player tracking card. In some embodiments, an identification card may be inserted to allow the EGM 10 to access an account balance associated with the user's account. The account balance may be maintained at a host system or other remote server accessible to the EGM 10 and the EGM 10 may adjust the balance based on game play on the EGM 10. In embodiments in which a stored value card is used, a balance may be stored on the card itself and the balance may be adjusted to include additional credits when a winning outcome results from game play.

The stored value card and/or identification card may include a memory and a communication interface which allows the EGM 10 to access the memory of the stored value card. The card may take various forms including, for example, a smart card, a magnetic strip card (in which case the memory and the communication interface may both be provided by a magnetic strip), a card with a bar code printed thereon, or another type of card conveying machine readable information. In some embodiments, the card may not be in the shape of a card. Instead, the card may be provided in another form factor. For example, in some embodiments, the card may be a virtual card residing on a mobile device such as a smartphone. The mobile device may, for example, be configured to communicate with the EGM 10 via a near field communication (NFC) subsystem.

The nature of the card reader interface 34 will depend on the nature of the cards which it is intended to interact with. The card reader interface may, for example, be configured to read a magnetic code on the stored value card, interact with pins or pads associated with the card (e.g., if the card is a smart card), read a bar code or other visible indicia printed on the card (in which case the card reader interface 34 may be an optical reader), or interact with the card wirelessly (e.g., if it is NFC enabled). In some embodiments, the card is inserted into the card reader interface 34 in order to trigger the reading of the card. In other embodiments, such as in the case of NFC enabled cards, the reading of the card may be performed without requiring insertion of the card into the card reader interface 34.

While not illustrated in FIG. 1, the EGM 10 may include a chair or seat. The chair or seat may be fixed to the EGM 10 so that the chair or seat does not move relative to the EGM 10. This fixed connection maintains the user in a position which is generally centrally aligned with the display 12 and the camera. This position ensures that the camera detects the user and provides consistent experiences between users.

The embodiments described herein are implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

Accordingly, the EGM 10 is particularly configured for moving game components. The displays 12, 14 may display via a user interface three-dimensional game components of a game in accordance with a set of game rules using game data, stored in a data storage device. The 3D game components may include 3D interface elements.

The embodiments described herein involve numerous hardware components such as an EGM 10, computing devices, ultrasonic transducers, cameras, servers, receivers, transmitters, processors, memory, a display, networks, and electronic gaming terminals. These components and combinations thereof may be configured to perform the various functions described herein, including the auto stereoscopy functions and the contactless tactile feedback functions. Accordingly, the embodiments described herein are directed towards electronic machines that are configured to process and transform electromagnetic signals representing various types of information. The embodiments described herein pervasively and integrally relate to machines, and their uses; and the embodiments described herein have no meaning or practical applicability outside their use with computer hardware, machines, a various hardware components.

Substituting the EGM 10, computing devices, ultrasonic transducers, cameras, servers, receivers, transmitters, processors, memory, a display, networks, and electronic gaming terminals for non-physical hardware, using mental steps for example, substantially affects the way the embodiments work.

At least some computer hardware features are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

In the example of FIG. 1, the ultrasonic emitters 19 are located at the sides of the display surface. To further illustrate this orientation, reference will now be made to FIG. 2 which illustrates the display 12 and the ultrasonic emitters shown in a front view and in isolation. Other components of the EGM 10 are hidden to facilitate the following discussion regarding the orientation of the ultrasonic emitters.

In this orientation, each ultrasonic emitter is adjacent a side of the display. One or more ultrasonic emitters 19 are located proximate a left side of the display 12, another one or more ultrasonic emitters 19 are located proximate a right side of the display 12, another one or more ultrasonic emitters 19 are located proximate a top side of the display 12 and another one or more ultrasonic emitters 19 are located proximate a bottom side of the display 12. In the example, four ultrasonic emitters 19 are provided. However, in other embodiments, the number of ultrasonic emitters 19 may be greater or less than four.

In this orientation, the ultrasonic emitters 19 emit an ultrasonic wave which does not travel through the display 12 before reaching the sensing space. This orientation can be contrasted with the orientation of another embodiment, which will be discussed below with reference to FIG. 4 in which the ultrasonic emitters 19 are located underneath the display 12 so that the ultrasonic wave must travel through the display in order to reach the sensing space.

Figure 2:
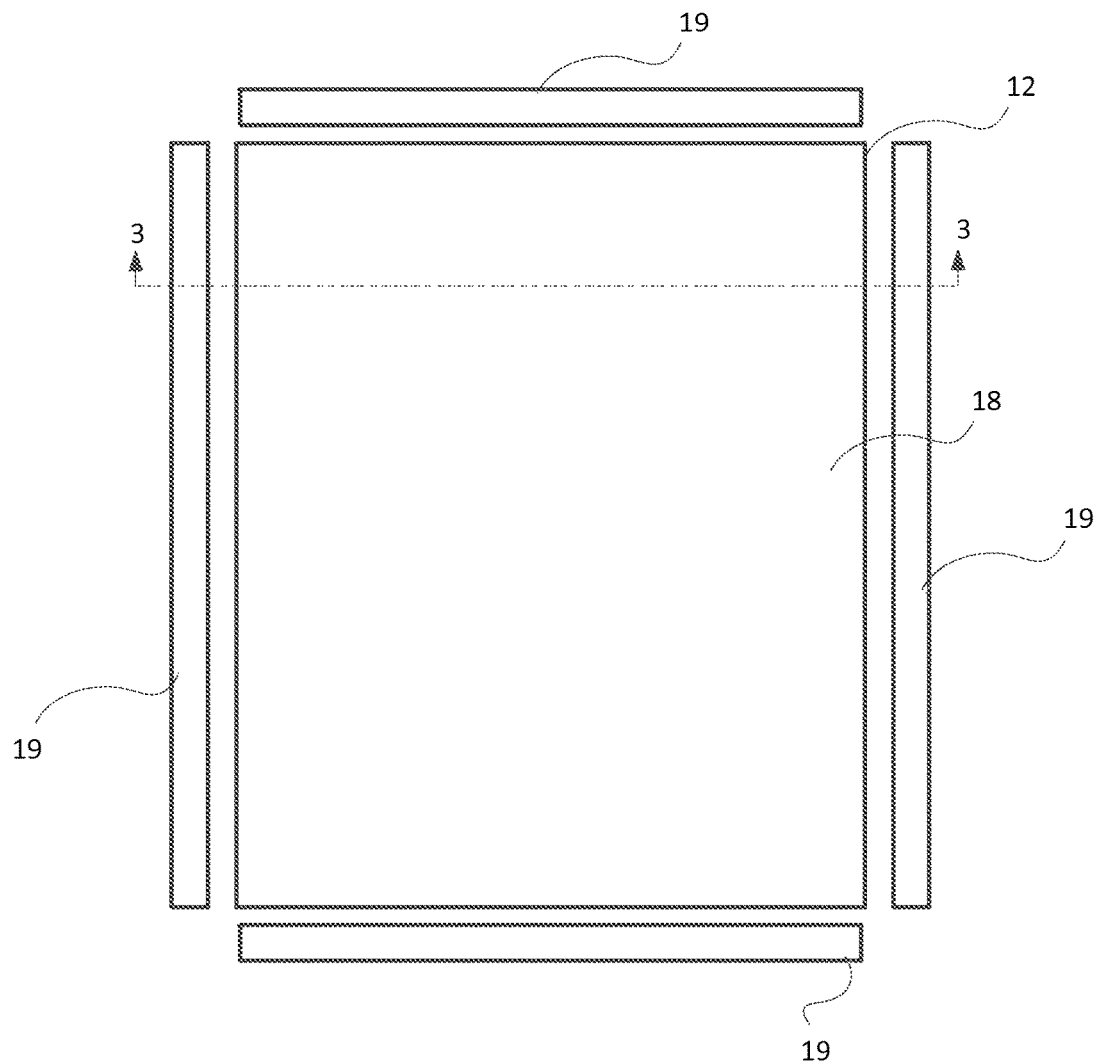
FIG. 2 shows a front view of an example display and example ultrasonic emitters in accordance with an embodiment of the present disclosure.
Figure 3:
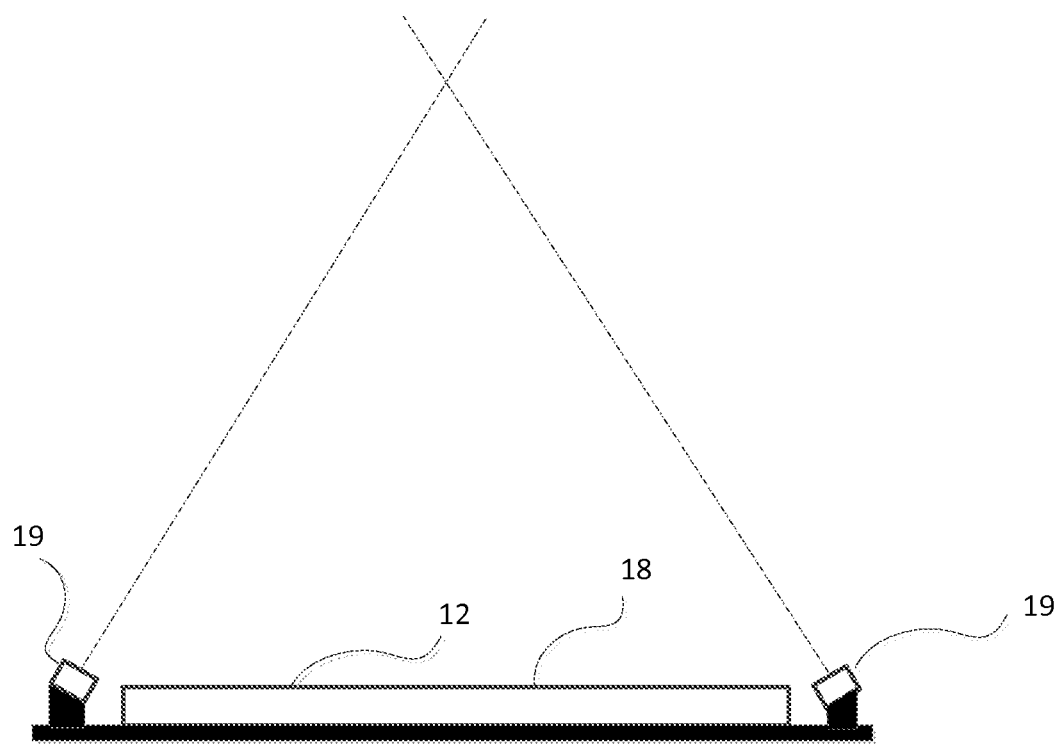
FIG. 3 illustrates a cross sectional view of the example display and example ultrasonic emitters taken along line 3-3 of FIG. 2.

In the embodiment of FIG. 2, the ultrasonic emitters 19 are angled relative to the display screen 18 of the display and are fixedly positioned with the EGM 10 (that is, the ultrasonic emitters do not move relative to the EGM 10). Such an orientation may be observed in FIG. 3 which illustrates a cross sectional view of the ultrasonic emitters 19 and the display 12 taken along line 3-3 of FIG. 2. As illustrated, each ultrasonic emitter faces a point which is generally above the display surface 18 of the display 12. That is, the ultrasonic field that is produced by each ultrasonic transducer is centered about a centerline that extends overtop the display surface. The centerline and the display surface 18 form an angle that is greater than zero degrees and less than 90 degrees.

Thus, the focal point that is provided by the ultrasonic transducer may be within the sensing space associated with the display 12. This sensing space is, in some embodiments, located generally between the player and the display 12. Since a player's hand may be located within the sensing space in order to interact with three dimensional interface elements provided in the game, the ultrasonic emitter 19 may be focussed at a focal point associated with the user's hand (e.g., the player's fingertip).

Figure 4:
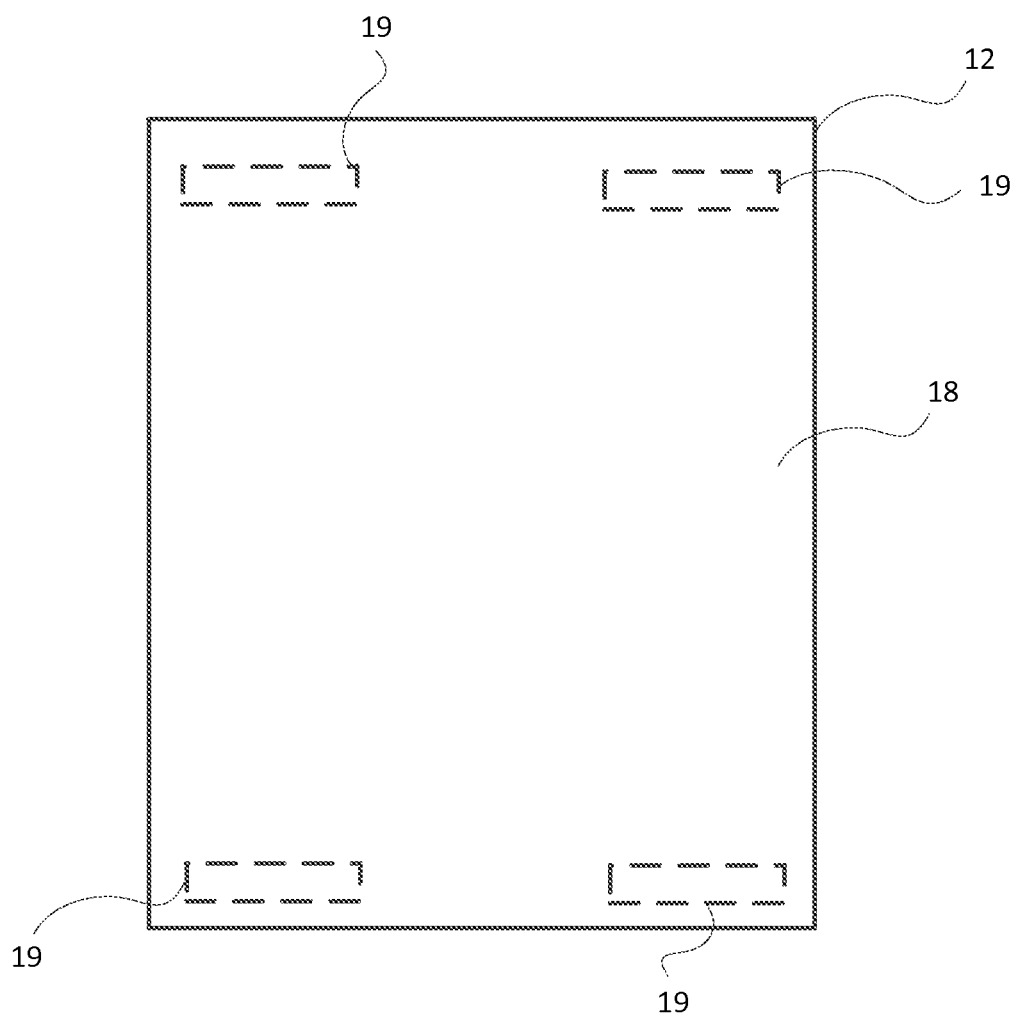
FIG. 4 illustrates a front view of a further example display and example ultrasonic emitters in accordance with an embodiment of the present disclosure.

Referring now to FIG. 4, a further example orientation of ultrasonic emitters 19 is illustrated. In this example, the ultrasonic emitters 19 are located under the display 12 such that the ultrasonic emitters 19 face the back side of the display 12. Each ultrasonic emitter is positioned to emit an ultrasonic field in the direction of the display 12. After the ultrasonic wave is emitted from the ultrasonic emitter 19, it travels through the display 12 before reaching the sensing space.

To minimize the attenuation caused by the display 12, the display 12 may be a relatively thin display. The thin display permits the ultrasonic field to pass though the display and into at least a portion of the sensing space. By way of example, in an embodiment, the display 12 is an OLED display.

In the example illustrated, an ultrasonic emitter is located near each corner of the display and there are four ultrasonic emitters, each providing at least one ultrasonic transducer. However, other configurations are also possible. The location of the ultrasonic transducers relative to the display 12 may correspond to the location of displayed interface elements within the game. For example, during the game an interface element may be displayed on a portion of the display that is aligned with at least a portion of one of the ultrasonic emitters. The ultrasonic emitter may emit an ultrasonic wave so that it has a focal point aligned with the interface element. For example, the focal point may be located in front of the interface element.

Other arrangements of ultrasonic transducers are also possible in other embodiments. For example, while in the embodiment of FIG. 4, at least a portion of the display 12 does not have an ultrasonic emitter 19 positioned underneath that portion, in other embodiments, ultrasonic emitters may be underneath all portions of the display 12.

Figure 5:
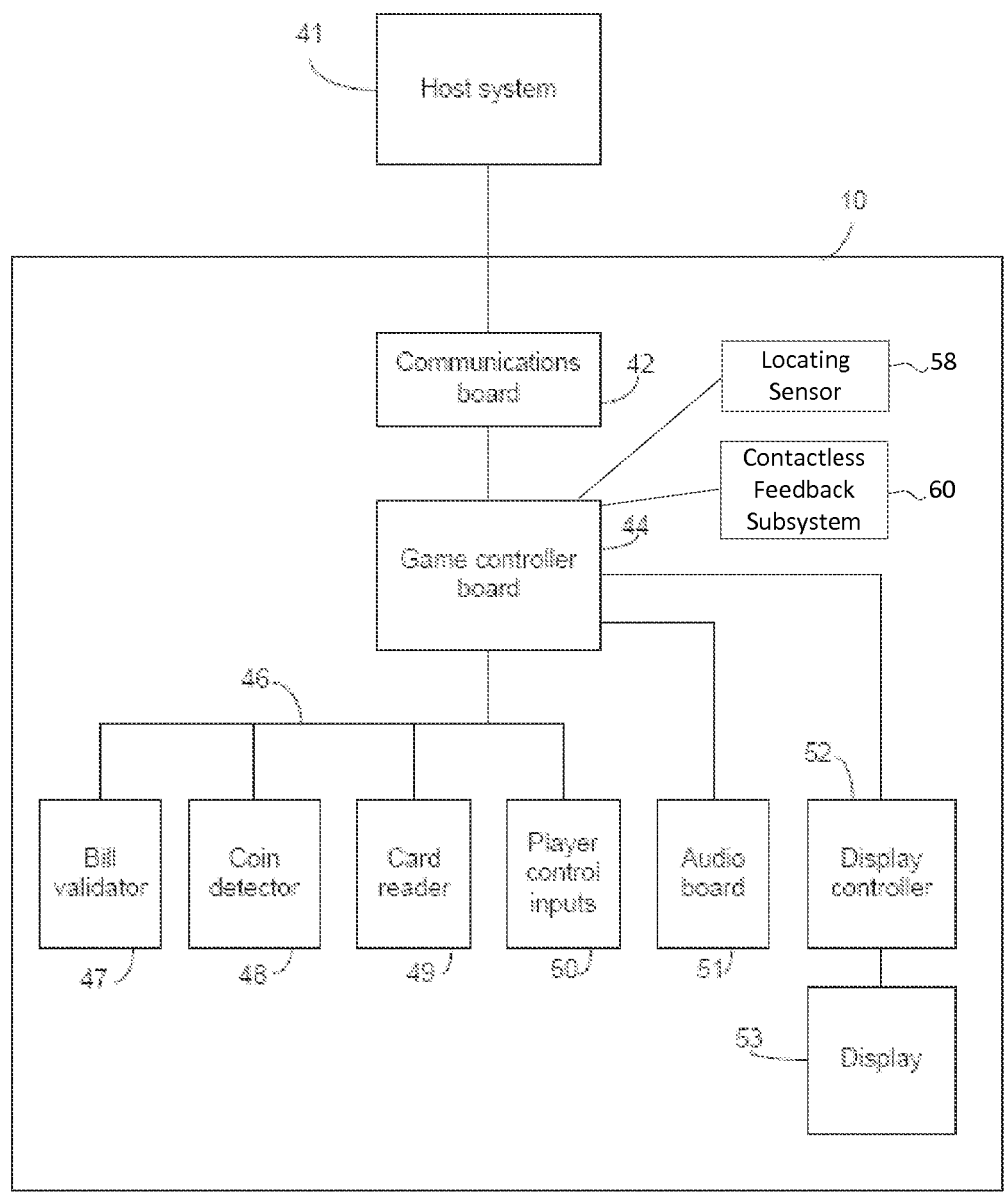
FIG. 5 illustrates a block diagram of an EGM in accordance with an embodiment of the present disclosure.

Reference will now be made to FIG. 5 which illustrates a block diagram of an EGM 10, which may be an EGM of the type described above with reference to FIG. 1.

The example EGM 10 is linked to a casino's host system 41. The host system 41 may provide the EGM 10 with instructions for carrying out game routines. The host system 41 may also manage a player account and may adjust a balance associated with the player account based on game play at the EGM 10.

The EGM 10 includes a communications board 42 which may contain conventional circuitry for coupling the EGM to a local area network (LAN) or another type of network using any suitable protocol, such as the Game to System (G2S) standard protocol. The communications board 42 may allow the EGM 10 to communicate with the host system 41 to enable software download from the host system 41, remote configuration of the EGM 10, remote software verification, and/or other features. The G2S protocol document is available from the Gaming Standards Association and this document is incorporated herein by reference.

The communications board 42 transmits and receives data using a wireless transmitter, or it may be directly connected to a network running throughout the casino floor. The communications board 42 establishes a communication link with a master controller and buffers data between the network and a game controller board 44. The communications board 42 may also communicate with a network server, such as the host system 41, for exchanging information to carry out embodiments described herein.

The communications board 42 is coupled to a game controller board 44. The game controller board 44 contains memory and a processor for carrying out programs stored in the memory and for providing the information requested by the network. The game controller board 44 primarily carries out the game routines.

Peripheral devices/boards communicate with the game controller board 44 via a bus 46 using, for example, an RS-232 interface. Such peripherals may include a bill validator 47, a contactless feedback subsystem 60, a coin detector 48, a card reader interface such as a smart card reader or other type of card reader 49, and player control inputs 50 (such as buttons or a touch screen). Other peripherals may include one or more cameras or other locating sensors 58 used for eye, hand, finger, and/or head tracking of a user to provide the auto stereoscopic functions and contactless tactile feedback function described herein.

The game controller board 44 may also control one or more devices that produce the game output including audio and video output associated with a particular game that is presented to the user. For example an audio board 51 may convert coded signals into analog signals for driving speakers. A display controller 52, which typically requires a high data transfer rate, may convert coded signals to pixel signals for the display 53. The display controller 52 and audio board 51 may be directly connected to parallel ports on the game controller board 44. The electronics on the various boards may be combined onto a single board.

The EGM 10 includes a locating sensor 58, which may be of the type described above with reference to FIG. 1 and which may be provided in a player feature locating subsystem. The EGM 10 also includes one or more ultrasonic emitters, which may be provided in a contactless feedback system 60. As described above, each ultrasonic emitter includes at least one ultrasonic transducer and may, in some embodiments, include an array of ultrasonic transducers.

The EGM 10 includes one or more processors which may be provided, for example, in the game controller board 44, the display controller 52, a player feature locating subsystem (not shown) and/or the contactless feedback subsystem 60. It will be appreciated that a single "main processor", which may be provided in the game controller board, for example, may perform all of the processing functions described herein or the processing functions may be distributed. For example, in at least some embodiments, the player feature locating subsystem may analyze data obtained from the location sensor 58, such as camera data obtained from a camera. A processor provided in the player feature locating subsystem may identify a location of one or more player features, such as the player's eyes, hand(s), fingertip, etc. This location information may, for example, be provided to another processor such as the main processor, which performs an action based on the location.

For example, in some embodiments, the main processor (and/or a processor in the display controller) may use location information identifying the location of the player's eyes to adjust the display 53 to ensure that the display maintains a stereoscopic effect for the player.

Similarly, the location of the player's hand(s) and/or fingertip may be provided to the main processor and/or a processor of the contactless feedback subsystem 60 for further processing. A processor may use the location of the player's hand(s) and/or fingertip to control the ultrasonic emitters. For example, in some embodiments, the processor may determine whether the location of the player's hand(s) and/or fingertip is a location that is associated with a three dimensional interface element of a game provided by the EGM 10. For example, in some embodiments, the processor may determine whether the player has activated the interface element with the player's hands. If so, then the processor may control one or more of the ultrasonic emitters based on the identified location to provide tactile feedback to the player at the identified location. It will be appreciated that processing may be distributed in a different manner and that there may be a greater or lesser number of processors. Furthermore, in at least some embodiments, some of the processing may be provided externally. For example, a processor associated with the host system 41 may provide some of the processing functions described herein.

Figure 6:
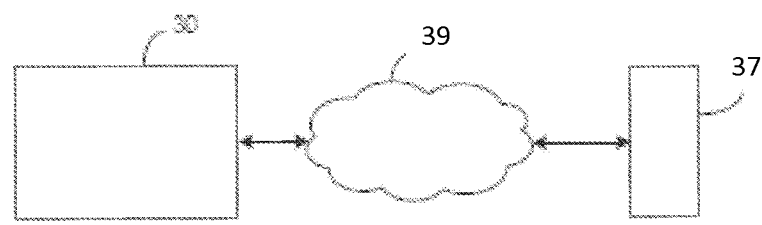
FIG. 6 is an example online implementation of a computer system configured for gaming.

The techniques described herein may also be used with other electronic devices, apart from the EGM 10. For example, in some embodiments, the techniques described herein may be used in a computing device 30. Referring now to FIG. 6, an example online implementation of a computer system and online gaming device is illustrated. For example, a server computer 37 may be configured to enable online gaming in accordance with embodiments described herein. Accordingly, the server computer 37 and/or the computing device 30 may perform one or more functions of the EGM 10 described herein.

One or more users may use a computing device 30 that is configured to connect to the Internet 39 (or other network), and via the Internet 39 to the server computer 37 in order to access the functionality described in this disclosure. The server computer 37 may include a movement recognition engine that may be used to process and interpret collected player movement data, to transform the data into data defining manipulations of game components or view changes.

The computing device 30 may be configured with hardware and software to interact with an EGM 10 or server computer 37 via the internet 39 (or other network) to implement gaming functionality and render three dimensional enhancements, as described herein. For simplicity only one computing device 30 is shown but system may include one or more computing devices 30 operable by users to access remote network resources. The computing device 30 may be implemented using one or more processors and one or more data storage devices configured with database(s) or file system(s), or using multiple devices or groups of storage devices distributed over a wide geographic area and connected via a network (which may be referred to as "cloud computing").

The computing device 30 may reside on any networked computing device, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these.

The computing device 30 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The computing device 30 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The computing device 30 may include one or more input devices, such as a keyboard, mouse, camera, touch screen and a microphone, and may also include one or more output devices such as a display screen (with three dimensional capabilities) and a speaker. The computing device 30 has a network interface in order to communicate with other components, to access and connect to network resources, to serve an application and other applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. The computing device 30 is operable to register and authenticate users (using a login, unique identifier, and password for example) prior to providing access to applications, a local network, network resources, other networks and network security devices. The computing device 30 may serve one user or multiple users.

Figure 7:
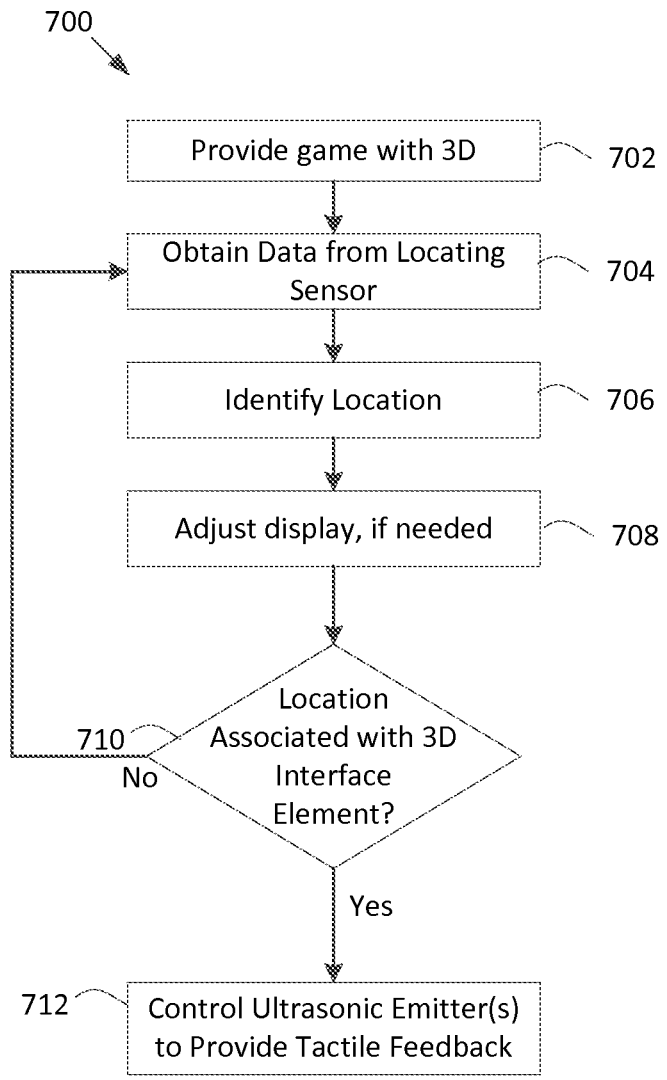
FIG. 7 is a flowchart of a method for providing contactless tactile feedback on a gaming system having an auto stereoscopic display.

Referring now to FIG. 7, an example method 700 will now be described. The method 700 may be performed by an EGM 10 configured for providing a game to a player, or a computing device 30 of the type described herein. More particularly, the EGM 10 or the computing device may include one or more processors which may be configured to perform the method 700 or parts thereof. In at least some embodiments, the processor(s) are coupled with memory containing computer-executable instructions. These computer-executable instructions are executed by the associated processor(s) and configure the processor(s) to perform the method 700. The EGM 10 and/or computing device that is configured to perform the method 700, or a portion thereof, includes hardware components discussed herein that are necessary for performance of the method 700. These hardware components may include, for example, a location sensor, such as a camera, a display configured to provide three dimensional viewing of at least a portion of the game, one or more ultrasonic emitters that are configured to emit an ultrasonic field when activated, and one or more processors coupled to the locating sensor, the plurality of ultrasonic emitters and the display. The processor(s) are configured to perform the method 700.

At operation 702, the EGM 10 provides a game to a player. The game may, for example, be a casino-based game in which the EGM 10 receives a wager from the player, executes a game session, and determines whether the player has won or lost the game session. Where the player has won the game session, a reward may be provided to the player in the form of cash, coins, tokens, credits, etc.

At least a portion of the game that is provided by the EGM 10 is provided in 3D. That is, a display of the EGM is configured to provide stereoscopic three dimensional viewing of at least a portion of the game.

In one operating mode, the EGM 10 provides an interface element for activation by the player. The interface element may be displayed on the display and may be activated, for example, when the player's hand contacts a location associated with the three dimensional element. The location may be, for example, a location that is aligned with the displayed interface element. For example, in an embodiment, the location is located away from the display along a line that is perpendicular to the displayed interface element. The location may be a predetermined distance from the display. For example, in an embodiment, the location may be 5-10 cm from the display and directly in front of the displayed interface element.

At operation 704, the EGM obtains data from a locating sensor. The locating sensor generates an electronic signal based on a player's location in a sensing space. The sensing space includes a region that is adjacent to the display surface of the display. More particularly, the sensing space may be a region that is generally in front of the display (e.g., between the display and the player).

In at least one embodiment, the locating sensor comprises a camera which may be a stereoscopic camera. The camera generates camera data which may be used to locate a feature associated with the player, such as a finger, hand and/or eye(s).

Accordingly, at operation 706, the EGM 10 identifies the location of one or more player features. For example, camera data generated by a camera may be analyzed to determine whether a particular player feature (such as the player's eyes, finger, hand, etc.) is visible in an image generated by the camera and the location of that feature. In at least some embodiments, the location is determined in two dimensions. That is, the location may be determined as x and y coordinates representing a location on a plane which is parallel to the display surface. In other embodiments, the location is determined in three dimensions. That is, the location may be determined as x, y and z coordinates representing the location of the player feature on a plane that is parallel to the display surface (which is represented by the x and y coordinates) and the distance between the display surface and the player feature (which is represented by the z dimension). The distance between the display surface and the player feature may be referred to as the depth of the player feature and it will be understood that the distance may be determined relative point on the EGM or any point fixed in space at a known distance from the EGM. That is, while the display may be measured between the display and the player feature in some embodiments, in other embodiments, the distance to the player feature may be measured from another feature (e.g., the camera).

To allow the distance to the player feature(s) to be determined, the camera may be a stereoscopic camera. The stereoscopic camera captures two images simultaneously using two cameras which are separated from one another. Using these two images, the depth of the player feature(s) may be determined.

In at least some embodiments, at operation 706 the EGM 10 identifies the location of a player hand feature. The player hand feature may be, for example, the player's finger. The player hand feature may be a particular finger in some embodiments, such as an index finger and the EGM 10 may identify the location of the index finger.

In identifying the location of a player hand feature, the EGM 10 may also identify an "active" hand. More particularly, the game may be configured to be controllable with a single hand and the player may be permitted to select which hand they wish to use in order to accommodate left handed and right handed players. The hand which the player uses to provide input to the game may be said to be the active hand and the other hand may be said to be an inactive hand. The EGM 10 may identify the active hand as the hand which is outstretched (i.e. directed generally towards the display). The inactive hand may be the hand that remains substantially at a user's side during game play.

In some embodiments, at operation 706, the EGM 10 may determine the location that is presently occupied by the player's hand. In other embodiments, the EGM 10 may determine a location that the hand is likely to occupy in the future. That is, the location may be a location which is within a path of travel of the player's hand. Such a location may be determined by performing a trajectory-based analysis of movement of the player's hand. That is, camera data taken over a period of time may be analyzed to determine a location or a set of locations that the user is likely to occupy in the future.

Operation 706 may rely on other locating sensors instead of or in addition to the camera. For example, in some embodiments, the locating sensor may be a touchscreen or hover-sensitive display which generates an electronic signal based on the location of a hand. In such embodiments, the electronic signal may be analyzed to determine the location of the player's hand in two dimensions (e.g. the x and y coordinates).

Accordingly, at operation 706 the location of a player feature that is used to input an input command to the EGM 10 (such as a player's hand) is determined. Additionally, a player's eyes may also be located. The location of the player's eyes is used to provide auto-stereoscopy. Based on the location of the player's eyes, an adjustment may be made to the display or the game at operation 708 to provide three dimensional viewing to the player. That is, adjustments may be made to account for the present location of the player's right and left eyes.

At operation 710, the EGM 10 determines whether the location of one or more of the player features, such as the player's hand or fingertip, is a location that is associated with a three dimensional interface element provided in the game. For example, in some embodiments, the EGM 10 determines whether the identified location is aligned with an interface element on the display. In at least some embodiments, the location will be said to be aligned with the interface element if it has an x and y coordinate that corresponds to an x and y coordinate occupied by the interface element. In other embodiments, the depth of the player feature (e.g., the distance between the player feature and the display) may be considered in order to determine whether the identified location is a location that is associated with the 3D interface element.

For example, in some embodiments, a three dimensional element may be activated when a user moves their hand to a particular location in space. The particular location may be separated from the display and may be aligned with a displayed interface element. For example, in some embodiments, when the player's hand is 5 centimeters from the display and the aligned with the interface element, the interface element may be said to be activated. In such embodiments, at operation 710, the EGM 10 may determine whether the location identified at operation 706 is a location that is associated with the particular location in space that causes the interface element to be activated. Accordingly, while not shown in FIG. 7, the method 700 may also include a feature of determining whether an input command (the input command may be received when the interface element is activated) has been received by analyzing the location sensor data and, if an input command is determined to have been received, performing an associated function on the EGM 10.

In some embodiments, when the location of the player feature identified at operation 706 is determined to be associated with the 3D interface element, then one or more of the ultrasonic emitters may be controlled at operation 712 in order to provide tactile feedback to the player. For example, one or more of the ultrasonic emitters may be activated to provide tactile feedback to the player using ultrasonic waves. The ultrasonic emitters may be controlled to focus the ultrasonic waves at the location of the player's hand and/or finger. For example, the ultrasonic emitters may be controlled to focus the ultrasonic waves at the location identified at operation 706. The ultrasonic emitter(s) provide a pressure differential at the identified location which may be felt by the player. In some embodiments, the ultrasonic emitters may focus the ultrasonic waves at the location that the player's hand currently occupies and in other embodiments, the ultrasonic emitters may focus the ultrasonic waves at a location to which the player's hand is expected to travel. Such a location may be determined by performing a trajectory-based analysis of movement of the player's hand. This analysis may be performed using camera data obtained over a period of time.

In order to focus the ultrasonic waves on the player's hand or finger, the EGM 10 may control the ultrasonic transducers of the ultrasonic emitters by: activating one or more of the ultrasonic transducers, deactivating one or more of the ultrasonic transducers, configuring a phase delay associated with one or more ultrasonic transducers, etc.

In at least some embodiments, the signal strength of one or more of the ultrasonic transducers may be controlled to configure the amount of air that is displaced by the ultrasonic waves. The signal strength (i.e. the strength of the ultrasonic field) may be controlled, for example, based on the depth of the player feature. For example, the signal strength may be increased when the player's hand is brought nearer the display or an interface element to provide feedback to the user to indicate how close the user is to the display or the interface element. Thus, the ultrasonic emitters may be controlled based on the distance to the player feature (e.g., the distance to the player's hand).

The triggering conditions that may cause ultrasonic tactile feedback to be provided by the EGM 10 may vary. For example, in some embodiments, such feedback is provided if it is determined that a user has activated an interface element. In some embodiments, such feedback is provided if it is determined that a user is near an interface element or a display (e.g., within a predetermined threshold distance from the interface element or the display). Other trigger conditions may be used in other embodiments. In at least some embodiments, the intensity of the tactile feedback may be varied to indicate the distance to the display or the interface element. Furthermore, other output devices, such as a speaker or vibratory output device which may be coupled to the player's chair may provide additional feedback to the player to complement the tactile feedback provided by the ultrasonic emitters.

While the EGM 10 that performs the method may, in some embodiments, be an EGM 10 of the type described above with reference to FIG. 1, in other embodiments the EGM 10 may take other forms. For example, in at embodiment, the EGM may be a portable computer such as a smartphone or a tablet computer. Since the EGM may be rotatable in such embodiments, the location of the interface elements that are displayed on the display may vary depending on the orientation of the device. An orientation sensor may be provided which generates an orientation signal based on the orientation of the EGM. The orientation signal is provide to a processor and the orientation signal may be used, in part during operation 710 when determining whether the location of the player feature (such as the player's hand) is a location associated with the three dimensional interface element.

Furthermore, the techniques provided herein may also be used with wearable devices such as virtual reality and augmented reality headsets. In some such embodiments, a virtual display could be projected in front of the player with floating objects. A projected ultrasound space could then be placed in front of the user and the location of the user's hands could be tracked with a camera or other locating sensor.

The methods and features described herein may be applied to other systems apart from the EGM 10. For example, the game may be played on a standalone video gaming machine, a gaming console, on a general purpose computer connected to the Internet, on a smart phone, or using any other type of gaming device. The video gaming system may include multiplayer gaming features.

The game may be played on a social media platform, such as Facebook™. The video gaming computer system may also connect to a one or more social media platforms, for example to include social features. For example, the video gaming computer system may enable the posting of results as part of social feeds. In some applications, no monetary award is granted for wins, such as in some on-line games. For playing on social media platforms, non-monetary credits may be used for bets and an award may comprise similar non-monetary credits that can be used for further play or to have access to bonus features of a game. All processing may be performed remotely, such as by a server, while a player interface (computer, smart phone, etc.) displays the game to the player.

The functionality described herein may also be accessed as an Internet service, for example by accessing the functions or features described from any manner of computer device, by the computer device accessing a server computer, a server farm or cloud service configured to implement said functions or features.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. A processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including an EGM, A Web TV, a Personal Digital Assistant (PDA), a smart phone, a tablet or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, a computer may receive input information through speech recognition or in other audible formats.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

As noted above, in at least some embodiments, the EGM 10 or computer could be connected to a network which provides some back-end functions to the EGM 10. In some embodiments, the rendering of 3D content could be performed on the back-end (i.e. on a device apart from the EGM 10). That is, in some embodiments, the 3D content is rendered locally on the EGM 10 and in other embodiments it is rendered on a server and streamed to the EGM.

While the present disclosure generally describes an EGM which includes one or more cameras for detecting a player's location and detecting movement of the player, in at least some embodiments, the EGM may detect player location and/or movement using other sensors instead of or in addition to the camera. For example, emitting and reflecting technologies such as ultrasonic, infrared or laser emitters and receptors may be used. An array of such sensors may be provided on the EGM in some embodiments or, in other embodiments, a single sensor may be used. Similarly, in some embodiments, other indoor high-frequency technologies may be used such as frequency modulated continuous radar.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the enhancements to game components may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods as described herein need not reside on a single computer or processor, but may be distributed in a modular fashion amongst a number of different computers or processors to implement various aspects.

Computer-executable instructions may be in many forms, such as program modules, executed by one or more computers or other devices. Generally, program modules include routines, programs, objects, components, data structures, etc, that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present game enhancements may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. While particular embodiments have been shown and described, it will be obvious to those skilled in the art that changes and modifications may be made without departing from this invention in its broader aspects. The appended claims are to encompass within their scope all such changes and modifications.

What is claimed is:

1. An electronic gaming machine for providing a game to a player, the electronic gaming machine comprising:
   a display having a display surface, the display being configured to provide stereoscopic three dimensional viewing of at least a portion of the game, the portion of the game including a three dimensional interface element for activation by the player;
   a locating sensor comprising a stereoscopic camera, the locating sensor generating an electronic signal based on a player's location in a sensing space, the sensing space including a region adjacent to the display surface;
   at least one ultrasonic emitter configured to emit an ultrasonic field when the ultrasonic emitter is activated, at least a portion of the ultrasonic field being located in the sensing space, the ultrasonic field providing a pressure differential detectible by a human hand, wherein the at least one ultrasonic emitter comprises a plurality of ultrasonic transducers; and
   one or more processors coupled to the display, the locating sensor and the plurality of ultrasonic emitters, the processor configured to:
      identify a location of one or more player features based on the electrical signal from the locating sensor;
      determine that the location of the one or more player features is associated with the three dimensional interface element;
      determine a distance to one or more of the player features based on stereoscopic camera data generated by the stereoscopic camera; and
      control one or more of the ultrasonic emitters based on the identified location to provide tactile feedback to the player by causing each of the ultrasonic transducers in the ultrasonic emitter to emit ultrasonic waves with a phase delay so that ultrasonic waves from multiple transducers arrive at the location of the one or more player features concurrently and by controlling a strength of an ultrasonic field associated with one or more of the ultrasonic emitters based on the distance.

2. The electronic gaming machine of claim 1, wherein at least one of the ultrasonic emitters is adjacent the display and is angled relative to the display such that the ultrasonic emitter faces a point which is generally above the display surface of the display.

3. The electronic gaming machine of claim 2, wherein the ultrasonic emitter is positioned to emit an ultrasonic field that is centered about a centerline that extends overtop the display surface.

4. The electronic gaming machine of claim 1, wherein the display surface is substantially rectangular having four sides and wherein the ultrasonic emitters include at least four ultrasonic emitters and wherein each side of the display surface has at least one ultrasonic emitter positioned adjacent that side.

5. The electronic gaming machine of claim 1, wherein controlling one or more of the ultrasonic emitters based on the location comprises controlling the ultrasonic emitter to provide a pressure differential at the identified location.

6. The electronic gaming machine of claim 1, wherein at least one of the ultrasonic emitters is located under the display such that the ultrasonic emitter faces a back side of the display and wherein the ultrasonic emitter is positioned to emit an ultrasonic field in the direction of the display, the display being a thin display to permit the ultrasonic field to pass through the display and into at least a portion of the sensing space.

7. The electronic gaming machine of claim 1, wherein the one or more player features include a player hand feature and wherein identifying a location comprises identifying a location of the player hand features.

8. The electronic gaming machine of claim 7 wherein the player hand feature is a finger.

9. The electronic gaming machine of claim 7 wherein controlling the one or more ultrasonic transmitters comprises providing the tactile feedback at the location associated with the player hand feature.

10. The electronic gaming machine of claim 9, wherein the location of the player hand feature is a location presently occupied by the player's hand.

11. The electronic gaming machine of claim 9, wherein the location of the player hand feature is a location in a path of travel of the player's hand that is determined based on a trajectory-based analysis of movement of the player's hand.

12. The electronic gaming machine of claim 7, wherein the one or more processors are further configured to adjust the display based on camera data generated by the camera to provide the stereoscopic three dimensional viewing.

13. The electronic gaming machine of claim 1, wherein the locating sensor comprises a touchscreen or a hover-sensitive display which generates an electronic signal based on the location of a hand.

14. The electronic gaming machine of claim 1, further comprising:
   an orientation sensor generating an orientation signal based on the orientation of the electronic gaming machine,
   and wherein the one or more processors are configured to use the orientation signal when determining that the location of the one or more player features is at a location associated with the three dimensional interface element.

15. A method for providing contactless feedback to a player at an electronic gaming machine, the method comprising:
- identifying a location of one or more player features using data from a locating sensor comprising a stereoscopic camera;
- determining that the location of the one or more player features is associated with a three dimensional interface element;
- determining a distance to one or more of the player features based on stereoscopic camera data generated by the stereoscopic camera; and
- controlling one or more ultrasonic emitters based on the identified location to provide tactile feedback to the player, wherein the one or more ultrasonic emitters each comprise a plurality of ultrasonic transducers, and wherein controlling the one or more ultrasonic emitters comprises causing ultrasonic transducers in the one or more ultrasonic emitters to emit ultrasonic waves with a phase delay so that ultrasonic waves from multiple transducers arrive at the location of the one or more player features concurrently and control a strength of an ultrasonic field associated with one or more of the ultrasonic emitters based on the distance.

16. The method of claim 15, wherein at least one of the ultrasonic emitters is adjacent a display and is angled relative to the display such that the ultrasonic emitter faces a point which is generally above a display surface of the display.

17. The method of claim 16, wherein the ultrasonic emitter is positioned to emit an ultrasonic field that is centered about a centerline that extends overtop the display surf ace.

18. The method of claim 16, wherein the display surface is substantially rectangular having four sides and wherein the ultrasonic emitters include at least four ultrasonic emitters and wherein each side of the display surface has at least one ultrasonic emitter positioned adjacent that side.

* * * * *